US010671483B1

(12) United States Patent
Todd et al.

(10) Patent No.: US 10,671,483 B1
(45) Date of Patent: Jun. 2, 2020

(54) CALCULATING DATA VALUE VIA DATA PROTECTION ANALYTICS

(71) Applicant: EMC Corporation, Hopkinton, MA (US)

(72) Inventors: Stephen Todd, Shrewsbury, MA (US); Jeffrey Norton, Laguna Niguel, CA (US); Scott Auchmoody, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 478 days.

(21) Appl. No.: 15/136,327

(22) Filed: Apr. 22, 2016

(51) Int. Cl.
*G06F 11/14* (2006.01)
*G06F 16/23* (2019.01)

(52) U.S. Cl.
CPC ...... *G06F 11/1451* (2013.01); *G06F 11/1464* (2013.01); *G06F 11/1469* (2013.01); *G06F 16/2365* (2019.01); *G06F 2201/80* (2013.01)

(58) Field of Classification Search
CPC ........... G06F 11/1451; G06F 17/30371; G06F 11/1464; G06F 11/1469; G06F 2201/80
See application file for complete search history.

(56) References Cited

U.S. PATENT DOCUMENTS

| | | |
|---|---|---|
| 6,715,145 B1 | 3/2004 | Bowman-Amuah |
| 6,957,227 B2 | 10/2005 | Fogel et al. |
| 7,574,426 B1 | 8/2009 | Ortega |
| 7,580,848 B2 | 8/2009 | Eder |
| 7,752,195 B1 | 7/2010 | Hohwald et al. |
| 7,890,451 B2 | 2/2011 | Cancel et al. |
| 7,970,729 B2 | 6/2011 | Cozzi |
| 8,561,012 B1 | 10/2013 | Holler et al. |
| 9,262,451 B1 | 2/2016 | Singh et al. |
| 9,384,226 B1 | 7/2016 | Goel et al. |
| 9,465,825 B2 | 10/2016 | Nelke et al. |
| 9,600,376 B1 * | 3/2017 | Krinke, II ........... G06F 11/1464 |
| 9,606,828 B2 | 3/2017 | Ghosh et al. |
| 9,851,997 B2 | 12/2017 | Gough et al. |
| 2001/0042062 A1 | 11/2001 | Tenev et al. |

(Continued)

OTHER PUBLICATIONS

U.S. Appl. No. 14/973,141 filed in the name of Stephen Todd et al., filed Dec. 17, 2015 and entitled "Automated Data Set Valuation and Protection."
U.S. Appl. No. 14/863,783 filed in the name of Stephen Todd et al., filed Sep. 24, 2015 and entitled "Unstructured Data Valuation."
U.S. Appl. No. 14/998,112 filed in the name of Stephen Todd et al., filed Dec. 24, 2015 and entitled "Data Valuation Based on Development and Deployment Velocity."
U.S. Appl. No. 14/973,096 filed in the name of Stephen Todd et al., filed Dec. 17, 2015 and entitled "Data Set Valuation for Service Providers."
U.S. Appl. No. 14/973,178 filed in the name of Stephen Todd, filed Dec. 17, 2015 and entitled "Timeliness Metrics and Data Valuation in Distributed Storage Systems."

(Continued)

*Primary Examiner* — Tarek Chbouki
*Assistant Examiner* — Maher N Algibhah
(74) *Attorney, Agent, or Firm* — Ryan, Mason & Lewis, LLP (57) ABSTRACT

A data protection ecosystem-based data valuation methodology includes the following steps. One or more of backup data, metadata, and analytics results maintained by a data protection ecosystem are accessed. The backup data, metadata, and analytics results are obtained during the course of the data protection ecosystem providing data backup and recovery functionalities for a data storage environment that stores one or more data sets. A valuation is calculated for at least one of the one or more data sets of the data storage environment based on at least a portion of the accessed backup data, metadata, and analytics results maintained by the data protection ecosystem.

20 Claims, 5 Drawing Sheets

(56) References Cited

U.S. PATENT DOCUMENTS

| | | |
|---|---|---|
| 2002/0049638 A1* | 4/2002 | Ito ................... G06Q 30/0239 |
| | | 705/14.39 |
| 2004/0122646 A1 | 6/2004 | Colossi et al. |
| 2005/0182739 A1 | 8/2005 | Dasu et al. |
| 2007/0005383 A1 | 1/2007 | Kasower |
| 2009/0018996 A1 | 1/2009 | Hunt et al. |
| 2009/0282089 A1 | 11/2009 | Lakshmanachar et al. |
| 2009/0327921 A1* | 12/2009 | Holm-Peterson ..... G06F 16/219 |
| | | 715/753 |
| 2010/0094685 A1 | 4/2010 | Young |
| 2010/0153324 A1 | 6/2010 | Downs et al. |
| 2010/0332401 A1* | 12/2010 | Prahlad ................ G06F 3/0649 |
| | | 705/80 |
| 2011/0055699 A1 | 3/2011 | Li et al. |
| 2011/0078603 A1 | 3/2011 | Koomullil |
| 2012/0084261 A1* | 4/2012 | Parab ............... G06F 17/30156 |
| | | 707/654 |
| 2012/0116911 A1 | 5/2012 | Irving et al. |
| 2012/0123994 A1 | 5/2012 | Lowry et al. |
| 2012/0310684 A1 | 12/2012 | Carter |
| 2012/0323843 A1 | 12/2012 | Bice et al. |
| 2013/0036091 A1* | 2/2013 | Provenzano ...... G06F 17/30162 |
| | | 707/624 |
| 2013/0055042 A1 | 2/2013 | Al Za'noun et al. |
| 2013/0073594 A1 | 3/2013 | Jugulum et al. |
| 2013/0110842 A1 | 5/2013 | Donneau-Golencer et al. |
| 2013/0151423 A1 | 6/2013 | Schmidt et al. |
| 2014/0052489 A1 | 2/2014 | Prieto |
| 2014/0324856 A1 | 10/2014 | Lahiani et al. |
| 2015/0120555 A1 | 4/2015 | Jung et al. |
| 2015/0134591 A1 | 5/2015 | Staeben et al. |
| 2015/0293974 A1 | 10/2015 | Loo |
| 2016/0055184 A1 | 2/2016 | Fokoue-Nkoutche et al. |
| 2016/0110819 A1 | 4/2016 | Abramowitz |
| 2016/0196311 A1 | 7/2016 | Wang et al. |
| 2016/0224430 A1 | 8/2016 | Long et al. |
| 2017/0236060 A1 | 8/2017 | Ignatyev |
| 2017/0293655 A1* | 10/2017 | Ananthanarayanan ..................... |
| | | G06F 17/30345 |

OTHER PUBLICATIONS

U.S. Appl. No. 15/073,741 filed in the name of Stephen Todd et al., filed Mar. 18, 2016 and entitled "Data Quality Computation for Use in Data Set Valuation."

U.S. Appl. No. 15/072,557 filed in the name of Stephen Todd et al., filed Mar. 17, 2016 and entitled "Metadata-Based Data Valuation."

U.S. Appl. No. 15/135,790 filed in the name of Stephen Todd et al., filed Apr. 22, 2016 and entitled "Data Valuation at Content Ingest."

U.S. Appl. No. 15/135,817 filed in the name of Stephen Todd et al., filed Apr. 22, 2016 and entitled "Data Value Structures."

U.S. Appl. No. 13/923,791 filed in the name of Stephen Todd et al., filed Jun. 21, 2013 and entitled "Data Analytics Computing Resource Provisioning."

U.S. Appl. No. 14/744,886 filed in the name of Marina Zeldin et al., filed Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center For Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

610
ACCESS ONE OR MORE OF BACKUP DATA, METADATA, AND ANALYTICS RESULTS MAINTAINED BY A DATA PROTECTION ECOSYSTEM, WHEREIN THE BACKUP DATA, METADATA, AND ANALYTICS RESULTS ARE OBTAINED DURING THE COURSE OF THE DATA PROTECTION ECOSYSTEM PROVIDING DATA BACKUP AND RECOVERY FUNCTIONALITIES FOR A DATA STORAGE ENVIRONMENT THAT STORES ONE OR MORE DATA SETS

620
CALCULATE A VALUATION FOR AT LEAST ONE OF THE ONE OR MORE DATA SETS OF THE DATA STORAGE ENVIRONMENT BASED ON AT LEAST A PORTION OF THE ACCESSED BACKUP DATA, METADATA, AND ANALYTICS RESULTS MAINTAINED BY THE DATA PROTECTION ECOSYSTEM

FIG. 7

CALCULATING DATA VALUE VIA DATA PROTECTION ANALYTICS

FIELD

The field relates generally to data processing and, more particularly, to data set valuation.

BACKGROUND

As enterprises or other entities collect more and more electronic data during the course of their data processing operations, they are recognizing the importance of calculating the value of such data, i.e., performing data valuation. The value of data is often defined in terms of its semantic content and relevance of that content to the business. Calculating the value of data has a broad set of benefits.

By way of example, data valuation can be used to set a price for the sale of data. Further, data valuation can be used as part of an asset valuation exercise (e.g., a bankruptcy). Data valuation can also be used to prioritize the business value of different data sets and modify the information technology (IT) infrastructure investment based on that value (e.g., use disaster recovery for higher value data sets). Still further, data valuation can be used to charge users for access to the data and receive a fee in return.

SUMMARY

Embodiments of the invention provide techniques for calculating data value via data protection analytics. Such techniques recognize benefits of calculating valuation of a data set stored in a data storage environment (e.g., production or primary storage environment) based on information obtained or calculated from a data protection ecosystem.

For example, in one embodiment, a method performed by one or more processing devices comprises the following steps. One or more of backup data, metadata, and analytics results maintained by a data protection ecosystem are accessed. The backup data, metadata, and analytics results are obtained during the course of the data protection ecosystem providing data backup and recovery functionalities for a data storage environment that stores one or more data sets. A valuation is calculated for at least one of the one or more data sets of the data storage environment based on at least a portion of the accessed backup data, metadata, and analytics results maintained by the data protection ecosystem.

Advantageously, illustrative embodiments provide data valuation techniques that are based on an analysis of data protection metadata related to content (i.e., a data set stored in the production or primary storage environment). Such analysis yields beneficial valuation insight. This data protection ecosystem type of valuation can be combined with valuation based on semantic content and relevance of the content to a given business to yield even larger and richer valuation insight.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"data protection ecosystem" illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients. Backup data, metadata, and analytics results are obtained during the course of the data protection ecosystem providing data backup and recovery functionalities for the primary storage environment;

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"client" illustratively refers to a customer or end user of a data storage system or some other form of cloud computing platform; the client accesses the platform via one or more client processing devices;

"structured data" illustratively refers to data that resides in fixed fields within a document, record or file, e.g., data contained in relational databases and spreadsheets; and "unstructured data" illustratively refers to data that is not considered structured data (in which case, some "semistructured" data asset may also be considered unstructured data), e.g., documents, free form text, images, etc.; and "metadata" illustratively refers to data that describes other data.

Figure 1:
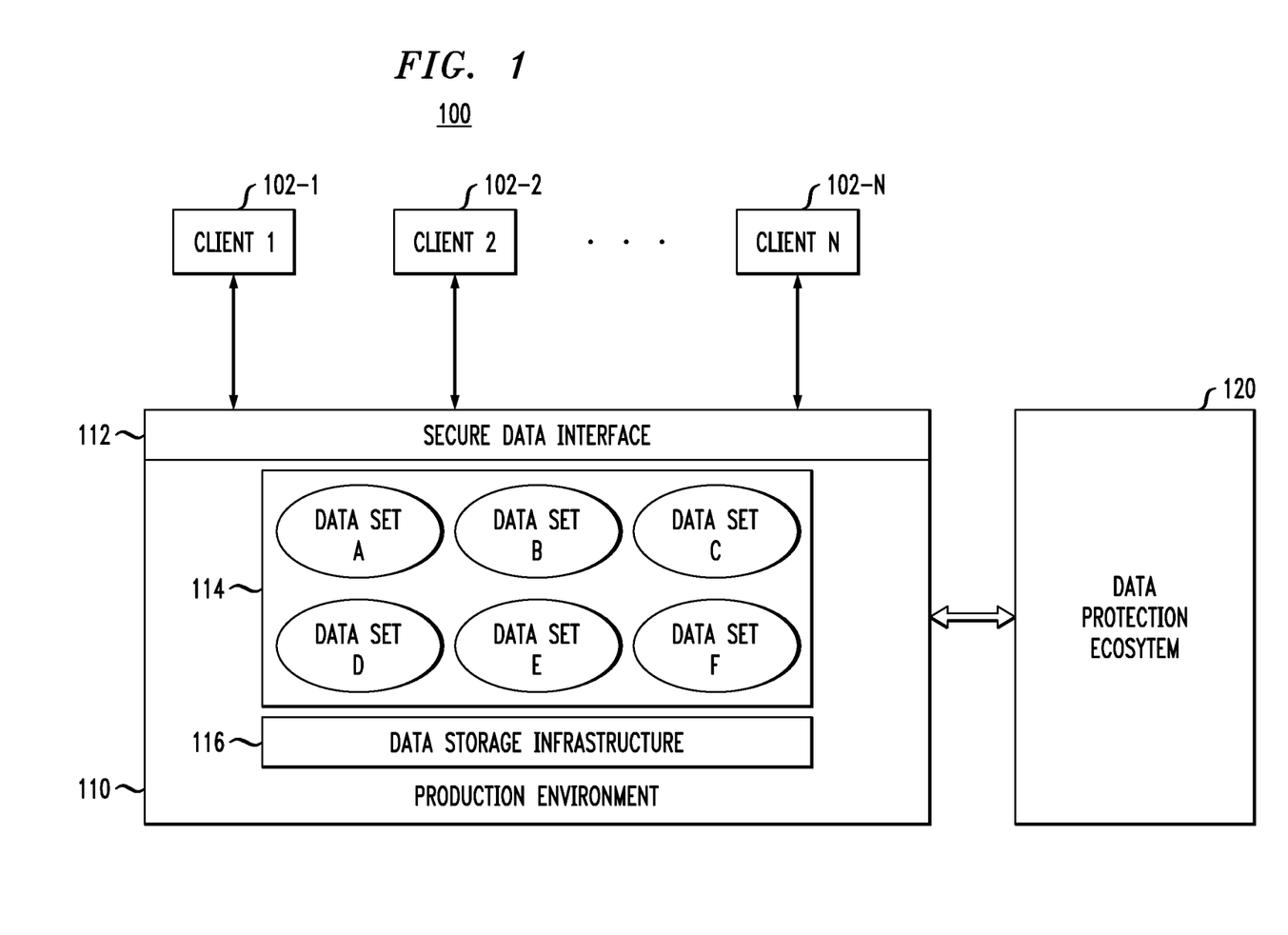
FIG. 1 illustrates a primary data storage and data protection environment in which embodiments of the invention can be implemented.

FIG. 1 illustrates a primary data storage and data protection environment in which embodiments of the invention can be implemented. As shown, in environment 100 (which may be implemented as a cloud computing platform in an illustrative embodiment), clients 102-1, 102-2, . . . , 102-N access production (or primary) data storage environment 110 through a secure data interface 112. The production environment 110 comprises a plurality of data sets 114 (data sets A-F) that are stored on data storage infrastructure 116. Data storage infrastructure 116 may comprise one or more compute elements (e.g., servers), network elements (e.g., switches, routers) and/or storage elements (e.g., storage devices, storage arrays). Production environment 110 can be part of a data center managed by a service provider. The data sets 114 may each have their own domain-specific data (e.g., customer data, employment data, credit data, etc.) relevant to one or more of clients 102-1, 102-2, . . . , 102-N. Thus, the data sets 114 are valuable to the clients and the service provider. Data protection ecosystem 120 is connected to production environment 110. The data protection ecosystem 120 comprises devices, subsystems, tools, algorithms, policies, schedules, mappings, catalogs, backup data, etc., as will be further explained, that serve to protect (through backup and recovery functionalities) data sets 114 in the production environment 110.

The value of data, such as the data sets 114, is intrinsically tied to the semantic content of the data. There are valuation techniques that compute the value of data based on its semantic content, examples of which will be described herein below. These techniques can be augmented with various forms of metadata to create richer valuation results. Similarly, any workflow related to content can be captured and likewise used for calculating an augmented value. In spite of these benefits, there are certain limitations to these existing valuation techniques.

The above-mentioned existing semantic content valuation techniques initially require a full scan of the production (or primary) copy of the data, along with some type of monitoring algorithm for scanning changed content. This places significant processing load on the production environment which may be unacceptable in some circumstances. Also, in order to calculate the validity (e.g., the quality of the content, e.g. missing or incorrect fields) of content, it is often required to perform deep inspection and conditioning of the data. This activity may also be unacceptable in a production environment.

Furthermore, the lifecycle of data reflects its use over a specified period of time. Most content does not keep provenance of its usage and therefore the semantic approach is not able to calculate a data lifecycle variable for a given file or other piece of content.

Semantic content is often disconnected from the business processes that leverage that content (e.g., the relevance of the content to the business is not obvious). Often times the content is used by several applications (e.g., one writer and multiple readers), yet this information cannot be inferred from an inspection of the content. In addition, the chain of writers and/or readers cannot always be implied from looking at, for example, the file metadata. It is realized herein that understanding the people that are using the content and how they map into the organization is a key part of valuation that cannot necessarily be determined by examining the content itself.

Still further, as modifications are made to content, there is no inherent content-based tracking mechanism to determine how frequently changes are being made to content and how quickly these changes are available for use (i.e., data timeliness).

Lastly, another method of calculating content value is by calculating the overall IT investment being made in storing and managing the content. For example, RAID5 versus RAID1 storage impacts the cost spent on storing the data. The number of snapshots (and type of snapshots) also impacts the cost. Replication to another system brings yet more costs. The investment in data protection is crucial to understanding data value but this investment cannot be calculated via semantic analysis.

To overcome these and other drawbacks associated with existing semantic content valuation techniques, illustrative embodiments of the invention provide data valuation techniques utilizing a data protection ecosystem.

Figure 2:
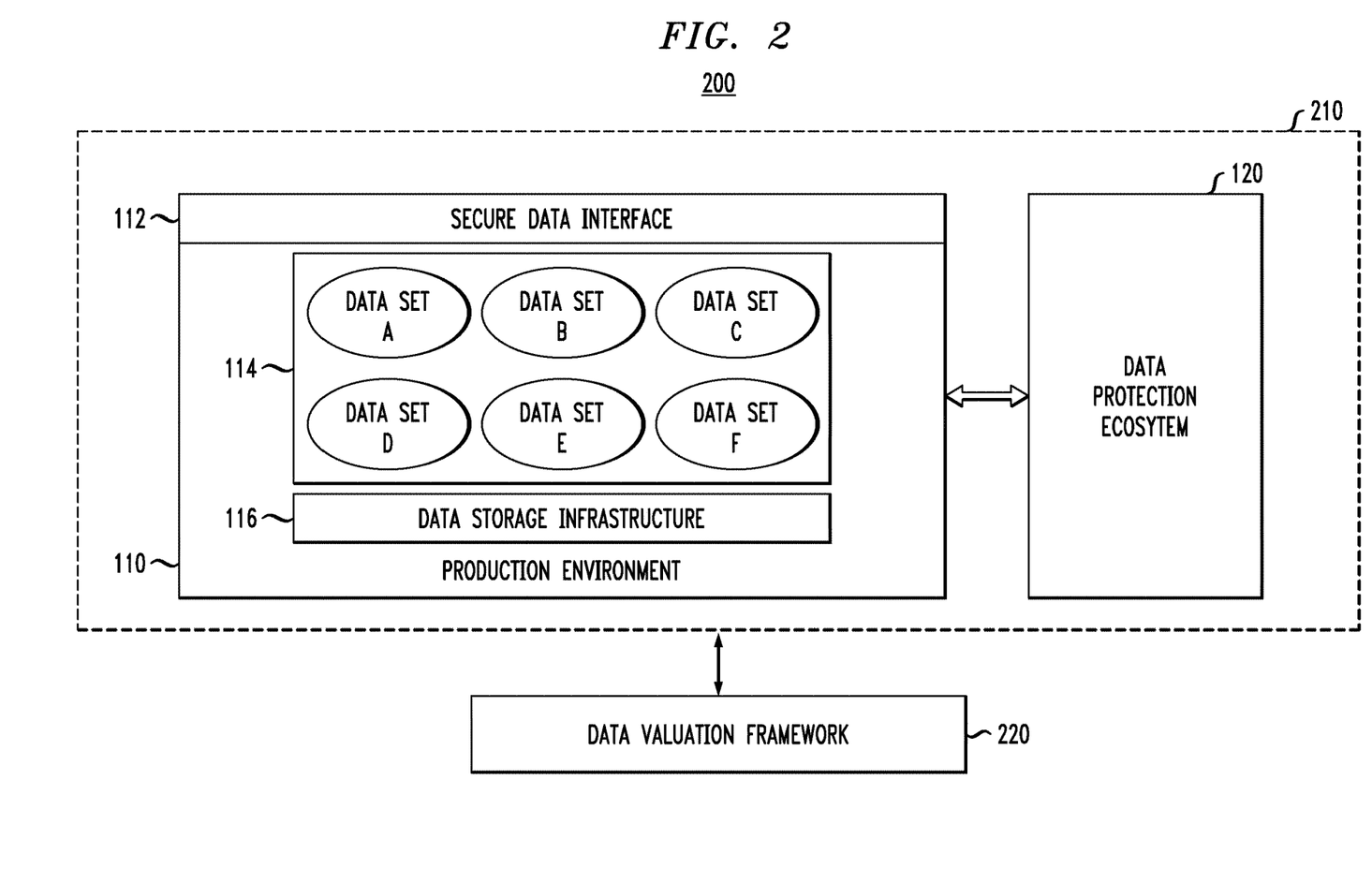
FIG. 2 illustrates a data valuation framework environment according to an embodiment of the invention.

FIG. 2 illustrates such a data valuation framework environment 200 according to an embodiment of the invention. As shown, the primary data storage and data protection environment 100 of FIG. 1 (including production environment 110 and data protection ecosystem 120), collectively referenced as 210 in FIG. 2, are operatively coupled to a data valuation framework 220. Illustrative features of the framework 220 will be described below in the context of FIGS. 3-6.

Data valuation framework 220 employs one or more data valuation methodologies for associating value with data sets 114 based on at least a portion of backup data, metadata, and analytics results maintained by a data protection ecosystem 120 as it protects data sets 114. Framework 220 leverages the data protection ecosystem and runs analytics across it to generate a rich set of valuation parameters that can be used to calculate data value.

Before describing data valuation methodologies of framework 220 that leverage the data protection ecosystem in accordance with embodiments of the invention, one or more semantic content valuation techniques will be described. It is to be understood that while data valuation methodologies leveraging the data protection ecosystem may be used alone to provide valuation for data in primary storage, such valuation techniques can also be combined with the one or more semantic content valuation techniques described below, as well as other valuation techniques.

Figure 3:
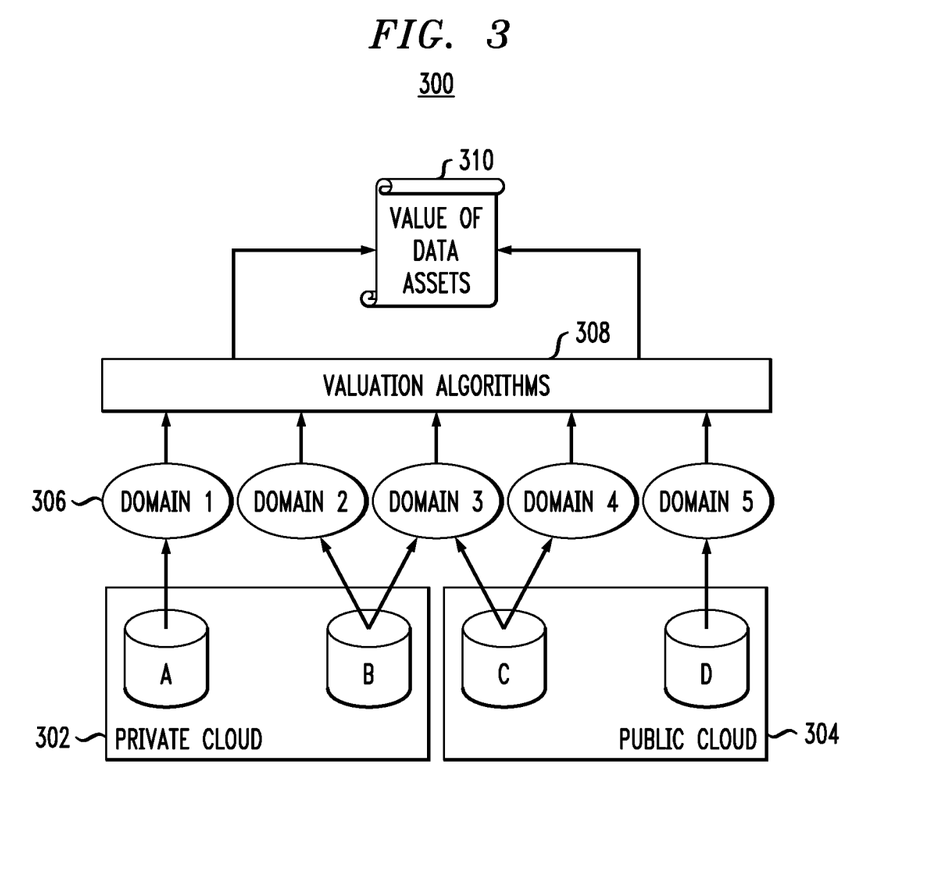
FIG. 3 illustrates a data valuation for unstructured data that can be employed with embodiments of the invention.

By way of one example only, FIG. 3 illustrates a semantic content valuation methodology 300 for unstructured data. This methodology is described in the U.S. patent application identified as Ser. No. 14/863,783, entitled "Unstructured Data Valuation," filed on Sep. 24, 2015, the disclosure of which is incorporated by reference herein. More particularly, methodology 300 in FIG. 3 illustrates a data valuation methodology wherein it is assumed that data repositories A and B are part of a private cloud environment 302 and data repositories C and D are part of a public cloud environment 304. Each repository contains one or more data sets (e.g., documents) that would benefit from data valuation. Assume also that each of the documents in data repositories A, B, C and D are processed to generate domain aware tokens. These domain aware tokens are grouped in domains 306 (domain 1 through domain 5). That is, domains 1 through 5 are subject matter domains to which the tokens are mapped (e.g., legal, finance, etc.). Despite being mapped to domains, the tokens still maintain their identification with the document from which they belong. By way of example only, metadata can be generated, such as an identifier (ID), and associated with (stored, attached, etc.) a token that identifies the document from which the token was derived.

The domain aware tokens are provided to valuation algorithms 308. A different valuation algorithm may be used for each context. As will be explained in detail, a value V is returned for each document based on the domain aware tokens for that document that are provided to the valuation algorithms 308. These values are denoted as 310 in FIG. 3. Thus, advantageously, domain-specific analysis results in a set of domain specific mapping results, some unique to each data set and some shared. The valuation algorithms 308 convert domains to a business value, as will be explained.

By way of another non-limiting example, one or more of the data valuation models described in D. Laney, "The Economics of Information Assets," The Center for Infonomics, Smarter Companies presentation, September 2011, may be employed as semantic content valuation methodologies. Such valuation models include a set of non-financial models and set of financial models. The non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

Figure 4:
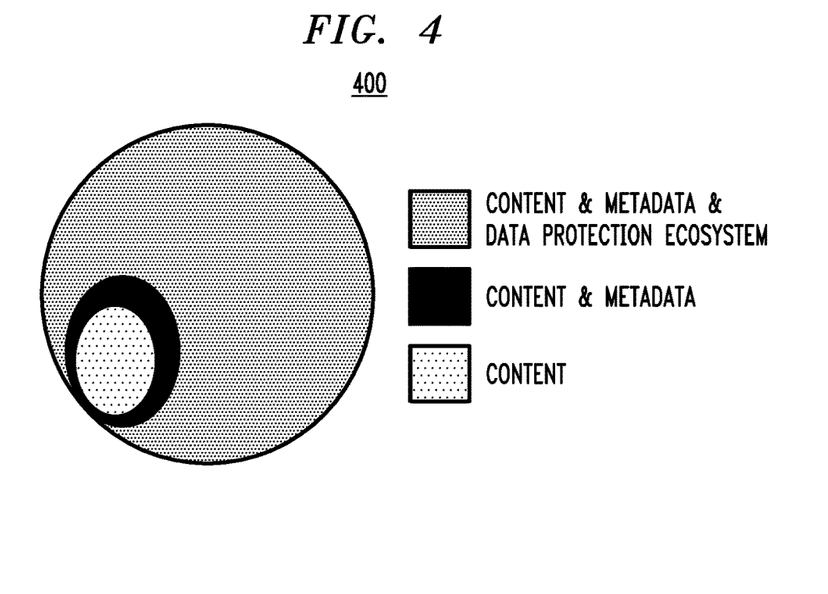
FIG. 4 illustrates a graphical depiction of valuation richness associated with data valuation methodologies according to embodiments of the invention.

FIG. 4 illustrates a graphical depiction of valuation richness associated with data valuation methodologies according to embodiments of the invention. Analysis of semantic file content (e.g., using methodology 300 in FIG. 3) yields a certain subset of valuation data. In addition, analysis of the content's metadata (e.g., modification time, users, etc.) provides an even larger subset of data. However, it is realized herein that an analysis of the data protection data, metadata, and/or analytics results related to a piece of content, in accordance with embodiments of the invention, yields an even larger and richer subset of valuation insight. Graphic 400 illustrates (via the shading denoted by the legend) this comparative relationship between the different types of valuation insight.

Valuation that leverages the data protection ecosystem 120 has many advantages.

For example, analytics that run across the data protection ecosystem 120 have access to content, metadata about content, and rich data protection and configuration information. Most of the time this information does not exist on the production environment 110 and therefore the impact of running analytics across the information will not impact the production environment 110.

Furthermore, in order to improve valuation results, it is often necessary to improve data quality (e.g., clean and condition the data). Performing this activity on protection (backup) content (e.g., a snapshot copy) allows data engineers to clean and sanitize data as an offline way of improving its value.

Data protection metadata (e.g., information about incremental copies) can track the history of user modification, for example, over a long period of time. The data protection copies of a file represent a much richer history of file usage and therefore a broader view into who uses this file across an enterprise (e.g., user provenance). This data can be fed into a relevance variable for one or the above-mentioned data valuation models for calculating data value.

As content is modified and data protection algorithms track these modifications over time, an overall picture emerges as to the lifecycle of the data (how often it changes or is used). This record is extremely useful for calculating a lifecycle valuation parameter.

Still further, the data protection ecosystem 120 can keep track of a variety of configuration settings that reflect how well-protected the content is or is not. For example, such configuration settings may, for example, specify: how many snapshots are maintained; whether or not the snapshots are copy-on-write; whether or not remote mirroring is used; whether or not protection operations are synchronous or asynchronous.

Analyzing the full breadth of protection resources can yield the content's overall worth from an infrastructure perspective. Comparing the infrastructure value to the business value of content can yield surprising under- or over-investment discoveries.

In one embodiment, this information is available via the data protections policies. Data protection policies typically include the number of copies taken per day, the number of times these copies are replicated, whether they are on-site or offsite copies, their retention time and their RPO (recovery point objective) and RTO (recovery time objectives) values.

An additional component of the above-mentioned business value model or index (BVI) can be:

$$BVI = K1 * number\_of\_onsite\_copies + K2 * number\_of\_offsite\_copies + K3 * Storage\ type\ of\ copies$$

In a similar way to the number of protection copies, the frequency of protection copies is important. For example, such information specifies how often incremental backups are run; and how often full backups are run.

Likewise, analyzing the full breadth of protection scheduling can reflect the content's overall value to the backup administrator (which can also be quite different to the value calculated to the business owner of the data).

It is further realized by illustrative embodiments that the data protection ecosystem 120 keeps track of information such as, for example: on what system is the primary copy stored; on what system(s) is/are the protection copies stored; what type of connection (e.g., pipe) is used between them the production environment (110) and the data protection ecosystem (120).

Understanding the physical configuration of the data protection ecosystem reflects the investment being made in data protection. This information also relates to value and cannot be determined through a simple semantic parsing.

Illustrative embodiments also realize that accessibility and ownership are key factors in valuation. That is, who owns and can access data can contribute to its value. This information can be derived by looking up the owner in Lightweight Directory Access Protocol (LDAP) or Active Directory from the file metadata. Data visibility is derived by looking at a file's access control list (ACL). For example, spreadsheets owned by the company president or chief executive officer may intrinsically have more value than someone in support. Data only visible to a small select group likely has more value than data readable by the entire company.

Figure 5:
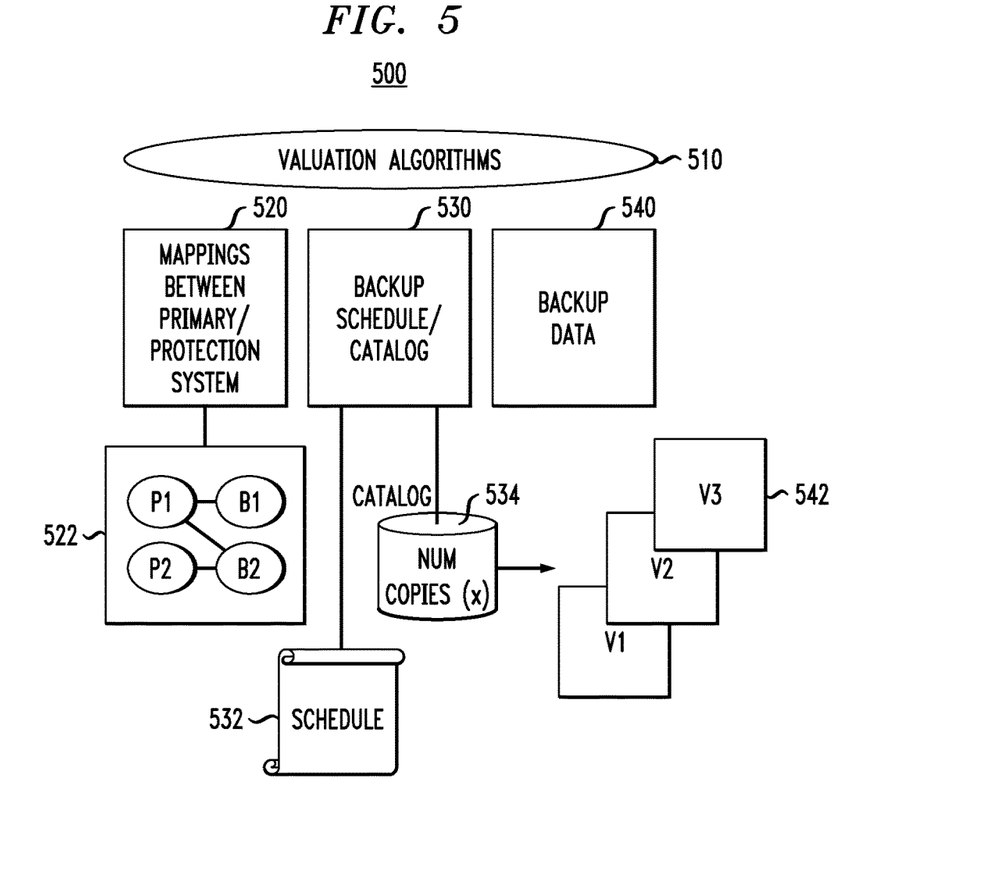
FIG. 5 illustrates a system for data valuation utilizing a data protection ecosystem according to an embodiment of the invention.

FIG. 5 illustrates a system 500 for data valuation utilizing a data protection ecosystem according to an embodiment of the invention. The system 500 implements the above and other features and functions by leveraging data, metadata, and/or analytics results from the data protection ecosystem 120. As shown, one or more valuation algorithms 510 receive information from one or more of the following logical objects: primary-to-protection system mappings 520 (illustrated by mapping 522); backup schedule/catalog 530 (illustrated by schedule 532 and catalog 534); and backup data 540 (illustrated by backup data sets, objects, files 542), that are part of the data protection ecosystem 120. It is to be appreciated that the logical objects shown in FIG. 5 are only examples of aspects and features of the data protection ecosystem that can be utilized to value data. Any other backup and recovery objects, not expressly shown, can also be employed.

As shown, the mappings 520 of primary systems (e.g., P1 and P2) to backup systems (e.g., B1 and B2) are depicted as a graph 522 (which may be stored as a file). By "system" here it is meant a storage subsystem (e.g., device, array, etc.) of the overall data storage system. Thus, for example, storage array B2 may serve as backup for storage arrays P1 and P2, while storage array B1 serves as a further backup for storage array P1. The backup schedule 532 (e.g., how often backup operations are performed and details about the operations) and catalog 534 (e.g., descriptive data representing lookup information such as the number and location of snapshot copies or backup data for each primary data set or object) likewise can be implemented as databases, as well as the actual backup data 542 (e.g., data sets or data objects V1, V2, and V3). One or more valuation algorithms 510 that valuate the versioned data and metadata represented in FIG. 5 are executed separately from the production systems (e.g., P1, P2). This solves the problem of placing a load on the primary systems when executing valuation algorithms. Examples of the one or more valuation algorithms 510 may include but are not limited to assigning scores from predetermined score ranges to the various logical objects that make up the data protection system. Furthermore, one or more of the above-mentioned data valuation models may serve as the one or more valuation algorithms 510. One ordinarily skilled in the art will realize other types of valuation algorithms that can be employed given the inventive teachings provided herein.

The creation of backup copies of production data provides the opportunity for data engineers to perform conditioning and cleaning operations on data (e.g., data V3 in 542). Should the cleaning operations effectively increase the value of the data (as indicated by the valuation algorithms), these results can be folded back or otherwise imported back into the production copies.

One of the benefits of running data valuation algorithms against a backup and recovery repository is the fact that these repositories have the capability to track the lineage or provenance of a file or data set. For example, files V1, V2, and V3 can represent successive versions of the same file. By running one or more valuation algorithms 510 across all three versions, it is possible to observe fluctuations in value (either positively or negatively), and zero in on the exact changes that caused the shift in value. This is less easy to do (or impossible) in a production environment.

In addition to the value of file content, the investment level from an infrastructure perspective can also be used to determine a different dimension of value. Using the example above, one or more valuation algorithms 510 can determine: (a) what type of primary storage system does the data reside on (e.g., P1 and P2); (b) what type of pipe (e.g., fast, slow, etc.) is used for the connectivity to the backup systems; and (c) the nature of the backup systems (e.g., B1 and B2); and (d) how many copies are currently active for that primary data set. All of this information adds up to a specific level of investment being made by the IT infrastructure, and this value can be more accurately determined by using the above-described valuation techniques.

Figure 6:
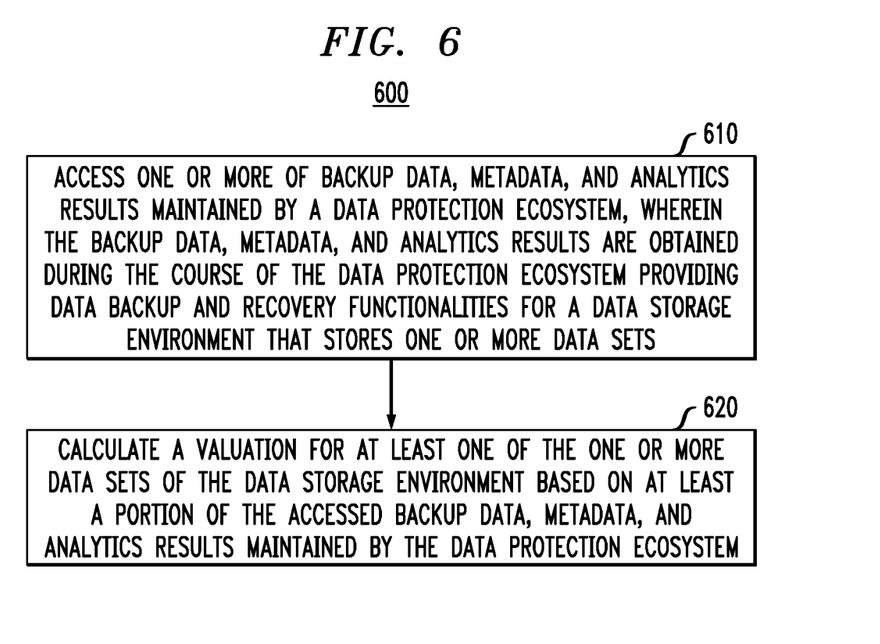
FIG. 6 illustrates a methodology for data valuation utilizing a data protection ecosystem according to an embodiment of the invention.

FIG. 6 illustrates a methodology 600 summarizing data valuation utilizing a data protection ecosystem according to an embodiment of the invention. As shown, step 610 accesses one or more of backup data, metadata, and analytics results maintained by a data protection ecosystem. The backup data, metadata, and analytics results are obtained during the course of the data protection ecosystem providing data backup and recovery functionalities for a data storage environment that stores one or more data sets. Step 620 then calculates a valuation for at least one of the one or more data sets of the data storage environment based on at least a portion of the accessed backup data, metadata, and analytics results maintained by the data protection ecosystem.

Figure 7:
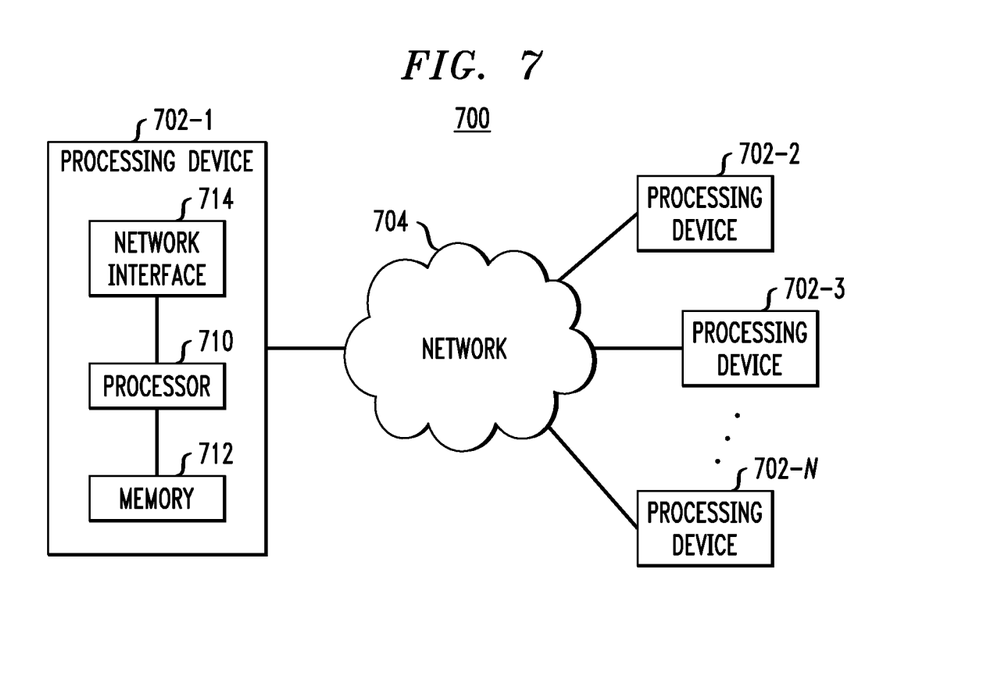
FIG. 7 illustrates a processing platform used to implement a data valuation framework according to an embodiment of the invention.

As an example of a processing platform on which a data valuation framework environment (as shown in FIGS. 1-6) according to illustrative embodiments can be implemented is processing platform 700 shown in FIG. 7. The processing platform 700 in this embodiment comprises a plurality of processing devices, denoted 702-1, 702-2, 702-3, ... 702-N, which communicate with one another over a network 704. It is to be appreciated that the data valuation methodologies described herein may be executed in one such processing device 702, or executed in a distributed manner across two or more such processing devices 702. Thus, the framework environment may be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device, such as the processing device 702-1, causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 700 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    accessing one or more of backup data, metadata, and analytics results maintained by a data protection ecosystem, wherein the one or more of the backup data, metadata, and analytics results are obtained during the course of the data protection ecosystem providing data backup and recovery functionalities for a production data storage environment that stores one or more data sets;
    calculating a valuation for the one or more data sets of the production data storage environment based on at least a portion of the one or more of the accessed backup data, metadata, and analytics results maintained by the data protection ecosystem;
    wherein the accessing and calculating steps are performed by one or more processing devices, each processing device comprising a processor and a memory;
    further including performing one or more data quality improvement operations on the backup data prior to calculating the valuation, and importing results thereof into the production data storage environment that stores the one or more data sets;
    wherein the metadata maintained by the data protection ecosystem comprises information defining one or more data protection policies in place in the data protection ecosystem, and the step of calculating the valuation further comprises utilizing the data protection policy information as a variable in the valuation calculation;
wherein the information defining the one or more data protection policies in place in the data protection ecosystem further comprises information indicating a number of backup data copies created of the one or more data sets within the production data storage environment by the data protection ecosystem in a given time period, and further comprising utilizing the number of backup copies created of the one or more data sets within the production data storage environment by the data protection ecosystem in the given time period as a variable in the valuation calculation;
wherein calculating the valuation further includes executing one or more data valuation algorithms against multiple versions of the backup data copies created from the one or more data sets within the production data storage environment and utilizing results produced by the data valuation algorithms in determining the valuation of the one or more data sets of the production data storage environment;
wherein the one or more data valuation algorithms are executed separately from the production data storage environment; and
wherein the calculated valuation comprises one or more of a quality, a cost of storing, a cost of losing, a market value, an economic value, a measure of correctness, a measure of completeness, a measure of relevance or a measure of exclusivity, of the one or more data sets.

2. The method of claim 1, wherein at least a portion of the analytics results maintained by the data protection ecosystem are generated by executing one or more analytics operations on one of the backup data and metadata maintained by the data protection ecosystem.

3. The method of claim 1, wherein at least a portion of the metadata maintained by the data protection ecosystem is generated from the backup data maintained by the data protection ecosystem.

4. The method of claim 1, wherein the metadata maintained by the data protection ecosystem comprises information describing incrementally modified versions of at least one of the data sets stored in the production data storage environment, and wherein calculating the valuation further comprises utilizing the incremental modification information as a variable in the valuation calculation.

5. The method of claim 1, wherein the metadata maintained by the data protection ecosystem comprises information identifying persons who created modified versions of at least one of the data sets stored in the production data storage environment, and wherein calculating the valuation further comprises utilizing the information identifying persons as a variable in the valuation calculation.

6. The method of claim 1, wherein the information indicating the number of backup data copies created in a given time period further comprises an indication of whether the backup data copies are incremental backup data copies or full backup data copies.

7. The method of claim 1, wherein the information defining one or more data protection policies in place in the data protection ecosystem further comprises at least one of the following:
information indicating the number of times the backup data copies are replicated; and
information indicating whether or not the backup data copies are copy-on-writing.

8. The method of claim 1, wherein the information defining one or more data protection policies in place in the data protection ecosystem further comprises information indicating whether the backup data copies are stored on a storage infrastructure of the production data storage environment or on a storage infrastructure remote from the storage infrastructure of the production data storage environment.

9. The method of claim 1, wherein the information defining one or more data protection policies in place in the data protection ecosystem further comprises at least one of the following:
information indicating a backup data storage retention time;
information indicating a recovery point objective; and
information indicating a recovery time objective.

10. The method of claim 1, wherein the metadata maintained by the data protection ecosystem comprises information specifying: a type of storage infrastructure on which the data protection ecosystem is implemented; the type of storage infrastructure on which primary storage of the production data storage environment is implemented; and how storage infrastructures are connected.

11. The method of claim 1, wherein the metadata maintained by the data protection ecosystem comprises information specifying ownership of the one or more data sets stored on the production data storage environment.

12. The method of claim 1, wherein the metadata maintained by the data protection ecosystem comprises information specifying access control with respect to the one or more data sets stored on the production data storage environment.

13. An article of manufacture comprising a processor-readable storage medium having encoded therein executable code of one or more software programs, wherein the one or more software programs when executed by one or more processing devices implement steps of:
accessing one or more of backup data, metadata, and analytics results maintained by a data protection ecosystem, wherein the one or more of the backup data, metadata, and analytics results are obtained during the course of the data protection ecosystem providing data backup and recovery functionalities for a production data storage environment that stores one or more data sets;
performing one or more data quality improvement operations on the backup data and importing results thereof into the production data storage environment that stores the one or more data sets;
calculating a valuation for the one or more data sets of the production data storage environment based on at least a portion of the one or more of the accessed backup data, metadata, and analytics results maintained by the data protection ecosystem;
wherein the metadata maintained by the data protection ecosystem comprises information defining one or more data protection policies in place in the data protection ecosystem, and wherein calculating the valuation for the data set further comprises utilizing the data protection policy information as a variable in the valuation calculation;
wherein the information defining the one or more data protection policies in place in the data protection ecosystem further comprises information indicating a number of backup data copies created of the one or more data sets within the production data storage environment by the data protection ecosystem in a given time period, and further comprising utilizing the number of backup copies created of the one or more data sets within the production data storage environment by the data protection ecosystem in the given time period as a variable in the valuation calculation;

wherein calculating the valuation further includes executing one or more data valuation algorithms against multiple versions of the backup data copies created from the one or more data sets within the production data storage environment and utilizing results produced by the data valuation algorithms in determining the valuation of the one or more data sets of the production data storage environment;

wherein the one or more data valuation algorithms are executed separately from the production data storage environment; and wherein the calculated valuation comprises one or more of a quality, a cost of storing, a cost of losing, a market value, an economic value, a measure of correctness, a measure of completeness, a measure of relevance or a measure of exclusivity, of the one or more data sets.

14. The article of manufacture of claim 13, wherein the one or more software programs is configured to perform the one or more data quality improvement operations prior to calculating the valuation.

15. The article of manufacture of claim 13, wherein the information defining one or more data protection policies in place in the data protection ecosystem further comprises information indicating whether the backup data copies are stored on a storage infrastructure of the production data storage environment or on a storage infrastructure remote from the storage infrastructure of the production data storage environment.

16. The article of manufacture of claim 13, wherein the metadata maintained by the data protection ecosystem comprises information identifying persons who created modified versions of at least one of the data sets stored in the production data storage environment, and wherein calculating the valuation further comprises utilizing the information identifying persons as a variable in the valuation calculation.

17. The article of manufacture of claim 13, wherein the information indicating the number of backup data copies created in a given time period further comprises an indication of whether the backup data copies are incremental backup data copies or full backup data copies.

18. A system comprising:
one or more processors operatively coupled to one or more memories configured to:
access one or more of backup data, metadata, and analytics results maintained by a data protection ecosystem, wherein the one or more of the backup data, metadata, and analytics results are obtained during the course of the data protection ecosystem providing data backup and recovery functionalities for a production data storage environment that stores one or more data sets;
perform one or more data quality improvement operations on the backup data and importing results thereof into the production data storage environment that stores the one or more data sets; and
calculate a valuation for the one or more data sets of the production data storage environment based on at least a portion of the one or more of the accessed backup data, metadata, and analytics results maintained by the data protection ecosystem;

wherein the metadata maintained by the data protection ecosystem comprises information defining one or more data protection policies in place in the data protection ecosystem, and wherein to calculate the valuation for the data set further comprises to utilize the data protection policy information as a variable in the valuation calculation; and wherein the information defining the one or more data protection policies in place in the data protection ecosystem further comprises information indicating a number of backup data copies created of the one or more data sets within the production data storage environment by the data protection ecosystem in a given time period, and further comprising utilizing the number of backup copies created of the one or more data sets within the production data storage environment by the data protection ecosystem in the given time period as a variable in the valuation calculation;

wherein to calculate the valuation further includes executing one or more data valuation algorithms against multiple versions of the backup data copies created from the one or more data sets within the production data storage environment and utilizing results produced by the data valuation algorithms in determining the valuation of the one or more data sets of the production data storage environment;

wherein the one or more data valuation algorithms are executed separately from the production data storage environment; and wherein the calculated valuation comprises one or more of a quality, a cost of storing, a cost of losing, a market value, an economic value, a measure of correctness, a measure of completeness, a measure of relevance or a measure of exclusivity, of the one or more data sets.

19. The system of claim 18, wherein the information defining one or more data protection policies in place in the data protection ecosystem further comprises information indicating whether the backup data copies are stored on a storage infrastructure of the production data storage environment or on a storage infrastructure remote from the storage infrastructure of the production data storage environment.

20. The system of claim 18, wherein the metadata maintained by the data protection ecosystem comprises information identifying persons who created modified versions of at least one of the data sets stored in the production data storage environment, and wherein to calculate the valuation further comprises utilizing the information identifying persons as a variable in the valuation calculation.

* * * * *